United States Patent [19]

Slee

[11] Patent Number: 4,612,833
[45] Date of Patent: Sep. 23, 1986

[54] MACHINE TOOLS

[75] Inventor: Roger H. Slee, Warwick, England

[73] Assignee: AE PLC, Warwickshire, England

[21] Appl. No.: 649,485

[22] Filed: Sep. 11, 1984

[30] Foreign Application Priority Data

Sep. 21, 1983 [GB] United Kingdom ............... 8325294

[51] Int. Cl.⁴ .............................................. B23B 5/24
[52] U.S. Cl. ........................................ 82/18; 82/1.3; 82/2 B; 82/12
[58] Field of Search ...................... 82/18, 2 B, 2 E, 12, 82/20, 2 R, 19, 24 R, 1.2–1.5; 408/159, 181

[56] References Cited

U.S. PATENT DOCUMENTS

| 2,121,934 | 2/1935 | Snader . | |
|---|---|---|---|
| 2,720,806 | 2/1949 | Stewart . | |
| 3,391,586 | 7/1968 | Van Den Kieboom | 82/18 |
| 3,434,375 | 3/1969 | Clashausen | 82/24 R |
| 3,710,659 | 1/1973 | Pagella et al. | 82/2 E |
| 3,732,759 | 5/1973 | Fedorenko et al. | 82/19 |
| 3,835,739 | 9/1974 | Trees | 82/18 |
| 4,203,062 | 5/1980 | Bathen | 82/24 R |
| 4,250,775 | 2/1981 | Jerue et al. | 82/1.2 |
| 4,366,543 | 12/1982 | Feller et al. | 82/18 |

FOREIGN PATENT DOCUMENTS

| 1516951 | 2/1968 | France . | |
|---|---|---|---|
| 1261020 | 6/1969 | United Kingdom . | |
| 2061554 | 10/1979 | United Kingdom . | |
| 2046160 | 2/1980 | United Kingdom . | |
| 2124113 | 6/1982 | United Kingdom . | |
| 209179 | 3/1968 | U.S.S.R. | 408/159 |
| 656745 | 7/1975 | U.S.S.R. . | |

Primary Examiner—Lowell A. Larson
Assistant Examiner—Jerry Kearns
Attorney, Agent, or Firm—Leydig, Voit & Mayer, Ltd.

[57] ABSTRACT

A cat-head type machine tool is controlled by an electronic control system (28, 31) so as to allow relative movement between the rotating tools (11, 12) and the stationary workpiece (22) within a revolution of the tools, such that non-uniform and/or barrelled or oval profiles may be machined on a cyclindrical workpiece. This is particularly useful for the high speed production of pistons for internal combustion engines where such profiles can give a piston improved performance.

3 Claims, 2 Drawing Figures

MACHINE TOOLS

BACKGROUND OF THE INVENTION

1. Field of the Invention

The invention relates to machine tools and in particular to machine tools of the kind comprising a rotatable tool head which carries a plurality of tools for performing sequential machining steps on a generally stationary workpiece in a single pass. Such machine tools are commonly known as "cat-head" machines.

Such machine tools have a number of advantages. They are able to perform rough turning and finishing operations on a workpiece in a single pass and so increase considerably the rate of production of finished workpieces. In addition, because the workpiece is usually stationary, the finished workpiece can be very rapidly removed and replaced by a fresh workpiece.

2. Review of the Prior Art

There have been various proposals for varying the relative positions of the tools and the workpiece in order to produce non-cylindrical workpieces. In general, these have comprised stationarily arranged cam surfaces arranged remote from the tool head and followed by a cam follower whose movement is translated by a mechanical linkage into relative movements see, for example, French Patent Specification No. 1,516,951 and U.S. Pat. Spec. No. 2,720,806.

It is a disadvantage of such cat-head machines that they cannot machine workpieces to complex non-uniform shapes where complex tool movements within a revolution of the cat-head are required. This is of particular significance where the workpiece is an aluminium or aluminium alloy blank for forming a piston for an internal combustion engine. It has recently become apparent that the efficiency of operation of such pistons, and of the internal combustion engines which contain them, can be improved substantially if the piston is shaped to improve its lubrication characteristics. For example, it has been found that having non-uniform surface features can produce considerable improvements in performance.

SUMMARY OF THE INVENTION

According to the invention, there is provided a machine tool in which a rotating tool machines a workpiece to a profile which requires tool movements within a revolution thereof, and comprising a rotatable tool head which carries at least one tool for performing a machining step on a workpiece in a single pass, an electrical actuator for effecting relative movement of said at least one tool and the workpiece during a revolution of the rotation of the tool head in a machining pass to allow variation of the machined workpiece profile during each said revolution, and an electronic control system for generating electrical control signals which are representative of a required workpiece profile variation and which are fed to the actuator for effecting the required relative tool and workpiece movements.

BRIEF DESCRIPTION OF THE DRAWINGS

The following is a more detailed description of some embodiments of the invention, by way of example, reference being made to the accompanying drawings, in which.

DESCRIPTION OF THE PREFERRED EMBODIMENTS

The machine tool is of the "cat-head" type and is for machining piston blanks to have a required non-uniform profile with non-uniform surface features in order to improve its performance when installed in an internal combustion engine. These features may, for example, be of the kind described in British Patent Specification No. 2,104,188.

Figure 1:
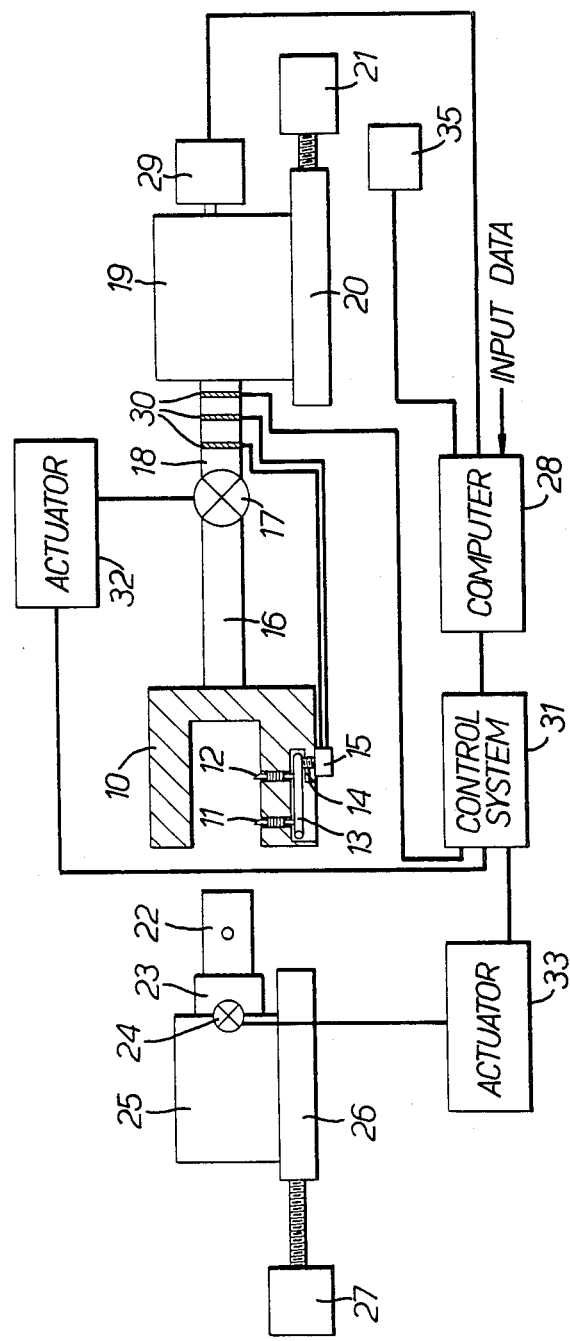
FIG. 1 is a schematic view of a machine tool.

Referring now to FIG. 1, the machine tool comprises a "cat-head" type tool head 10 of generally cylindrical shape open at one end and having two tools 11, 12 carried on its interior surface. The tools 11, 12 are so arranged that the tool 11 closest to the open end is a rough turning tool while the other tool is a finishing tool, so that the two tools 11, 12 machine the workpiece in sequence in a single pass. It will be appreciated that only a single tool may be provided or three or four or more tools may be provided. It will also be appreciated that where there are two or more tools, the sequential machining effect may be achieved by circumferential spacing of the tools in addition or as an alternative to the axial spacing of the tools.

The two tools 11, 12 are so mounted in the tool head 10 that they are movable in a radial direction. For this purpose, a pivoted bar 13 engages the outer ends of the tools 11, 12 and is engaged by a jacking screw 14 of a servo motor actuator 15 whose control is described in more detail below.

The tool head 10 is mounted for rotation on a shaft 16 which is connected to the output shaft 18 of a drive motor 19 by a pivot 17 normal to the axis of rotation of the tool head 10. An actuator 32 is provided for swinging the tool head 10 about the pivot 17. The tool head 10 and the drive motor 19 are in turn mounted on a feed slide 20 movable in a direction parallel to the axis of rotation of the tool head by a motor 21 for feeding the tools 11, 12 in a machining pass at a required feed rate.

The piston blank 22, forming the workpiece, is carried in a chuck 23 which is connected via a pivot 24 to a chucking head 25. The pivot 24 allows relative pivotal movement between the chuck 23 and the chucking head 25 about an axis normal to the axis of rotation of the tool head 10 and under control of an actuator 33. The chucking head 25 is carried on a slide 26 movable in a direction parallel to the axis of rotation of the tool head by a motor 27 to bring the workpiece 22 into a datum position for the commencement of machining.

The machine is controlled by a computer control system. The system includes a computer 28 which operates in the following way. The computer 28 is fed with input digital profile data which defines the required radius of the piston blank 22 at angular intervals around the periphery of the workpiece and at a number of axial locations along the workpiece, in order to provide a required workpiece profile. In practice, the required radius is generally specified as drops from a datum radius at, for example, 5° intervals around the workpiece at each axial position of the workpiece for which such a sequence of data is given say, 0.1 mm or 1 mm. Of course, if the workpiece is symmetrical about a plane including the workpiece axis or about two such planes mutually at right angles, and drops only 180° or 90° respectively are required.

The computer 28 produces from this data digital signals representative of the required relative positions of the tool and the workpiece at any instant. These are held in the computer and are outputted on receipt of the digital position signals from the angular encoder 29 and the feed encoder 35.

The output of the computer 28 is a sequence of digital signals representative of instantaneous required tool positions to achieve the required workpiece profile. These are received by a control system 31 which produces a control signal which is fed to the servo motor 15 via slip rings 30 carried on the output shaft of the drive motor 19. The servo motor 15 moves the jacking screw 14 in accordance with these signals and thus, via the bar 13, produces the required movements of the tools 11, 12.

Additionally or alternatively, the control system 31 may feed signals to the actuators 32, 33 for pivoting the tool head shaft 16 and the chuck 28 about their respective pivotal axes 17, 24. The angle of pivoting and the duration of pivoting are chosen so as to provide the required workpeice profile. In general, the shaft 16 will be pivoted in order to provide larger dimensional variations in the shape of the workpiece 22, while the tools 11, 12 will be actuated in order to provide smaller dimensional variations in the shape of the workpiece 22. For example, the actuators 32, 33 may be used to produce on the workpiece required variations in ovality along the piston or a required taper or barrel.

It will be appreciated that the tool head 10 may rotate at 50 revolutions or more per second. At this speed, the relative positions of the tools 11, 12 and the workpiece 22, must be changed within microseconds in order to achieve the required workpiece profile. For this reason, it is important for the tools to be of low mass and for the servo motor 15 to be able to react very rapidly indeed to control signals. Where the tool head is pivoted, it will also be appreciated that the tool head will be designed to have minimum inertia. This is also true of the chuck 23 where the workpiece 22 and chuck 23 are pivoted about the pivot axis 24.

It will be appreciated that the conversion of the control signal into tool movement may be achieved in a number of alternative ways by any form of transducer which converts an electrical signal into mechanical movement. For example, piezo-electrical or magnetostrictive effects may be used or electromagnetic effects may be used such as linear motors and solenoids which have the tool holder as a movable armature.

Figure 2:
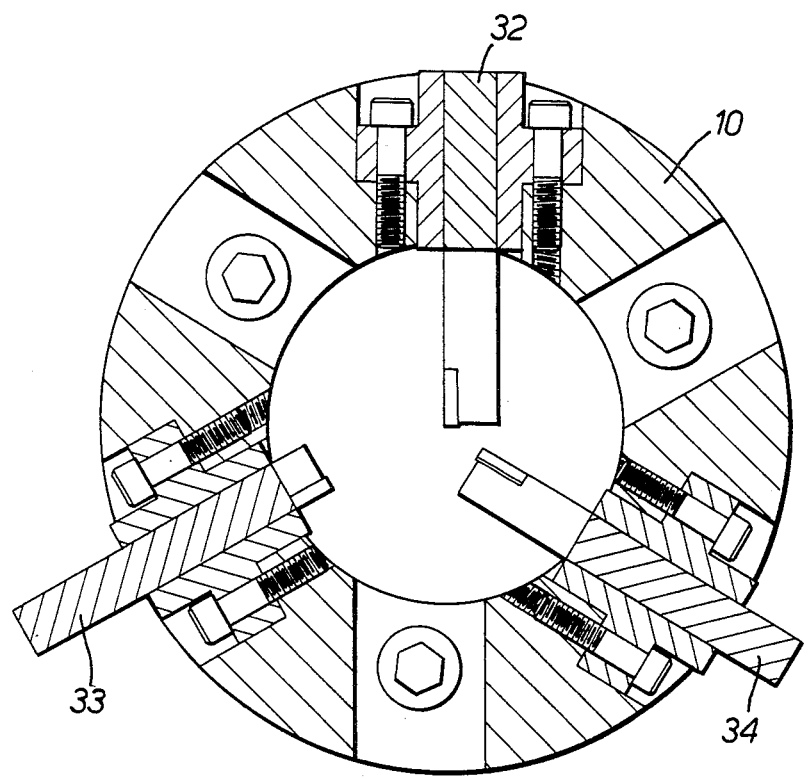
FIG. 2 is a cross-section through an alternative form of tool head for the machine tool of FIG. 1.

An alternative form of a tool head 10 is shown in FIG. 2. In the embodiment, the tool head 10 is provided with three tools 32, 33, 34 angularly spaced around the tool head 10. The tools 32, 33, 34 are mounted for movement in a radial direction in accordance with the control signals. This movement may be effected by any suitable actuator, such as solenoids or linear motors, of which the tool holders form respective movable armatures.

In addition, the control signal may be fed to the tool head in ways other than via the slip rings 30. For example, they may be conveyed by radio waves or ultrasonic waves or by light signals. In the last mentioned case, the signals may be conveyed to the tool head by a fibre optics system. Alternatively, at least a part of the computer control system may be provided on the tool head so that the computer control system rotates with the tool head 10. Of course, not all the computer control system may need be so mounted, there may only be provided on the tool head a store for storing future required tool positions and for outputting a control signal in accordance with the stored signals.

It will also be appreciated that in certain circumstances, it may only be necessary to control the pivoting of the workpiece or the pivoting of the tool head 10, or the radial movement of the tools 11, 12 in order to produce a required profile.

I claim:

1. A machine tool for machining piston blanks to have a non-uniform profile, comprising:
    a workpiece holder for holding a piston blank nonrotatably,
    a rotatable tool head of generally cylindrical shape open at one end for receipt of the piston blank.
    a tool mounted on the tool holder for movement radially relative to the axis of the cylindrical tool holder, axial feed means mounting said workpiece holder and said tool head for relative axial movement along said tool holder axis,
    a bar mounted on the tool head for pivoting movement about an axis on the tool head, one end of said bar engaging an outer end of the tool,
    a electrical actuator servo motor mounted on the tool head and having an output engaging an end of the bar opposite said end engaging an outer end of the tool.
    a shaft connected to the tool head for rotation of the tool head about the axis of the cylindrical tool head,
    a drive motor connected to the shaft for rotating the shaft and the tool head,
    angular position means operatively associated with said tool head for producing signals corresponding to the angualr position of the tool head.
    axial feed position means operatively associated with said axial feed means for producing signals corresponding to the position of the tool head along the rotational axis of the tool head.
    an electronic control system connected to the servo motor, the angular position means and the feed position means producing electrical control signals which correspond to said non-uniform profile and which are fed to said servo motor in accordance with said signals from said angular position means and said feed position means, whereby said servo motor pivots said bar about said axis to move the tool in said radial direction to machine the piston blank to said non-uniform profile.

2. A machine tool according to claim 1, wherein said tool is one of two tools provided on the tool head and spaced axially along the tool head for performing sequential machining steps on the workpiece in a single pass, said bar contacting the two tools so that both tools are moved radially by the bar in accordance with the electrical control signals.

3. A machine tool for machining piston blanks to have a non-uniform profile, comprising:
    a workpiece holder for holding a piston blank nonrotatably,
    a tool head of generally cylindrical shape open at one end for receipt of the piston blank,
    a tool mounted on the tool holder for movement radially relative to the axis of the cylindrical tool holder and forming an armature,
    an electrical coil mounted on the tool head and surrounding said tool armature, a shaft connected to the tool head for rotation of the tool head about the axis of the cylindrical tool head, a drive motor connected to the shaft for rotating the shaft, axial feed means mounting said workpiece holder and said tool head for relative axial movement along said tool axis angular position means operatively associated with said tool head for producing signals corresponding to the angular position of the tool head, axial feed position means operatively associated with said axial feed means for producing signals corresponding to the position of the tool head along the rotational axis of the tool head, a control system connected to the electrical coil, the angular position means and the feed position means producing electrical control signals which correspond to said non-uniform profile and which are fed to said electrical coil in accordance with said signals from said angular position means and said feed position means, whereby said electrical coil moves said tool in said radial direction to machine the piston blank to said non-uniform profile.

* * * * *